(12) United States Patent
Rossanese et al.

(10) Patent No.: US 7,674,415 B2
(45) Date of Patent: *Mar. 9, 2010

(54) PROCESS FOR THE PRODUCTION OF PLATES MADE OF TRANSPARENT PLASTIC MATERIAL WITH NON-TRANSPARENT OVERINJECTED PARTS

(75) Inventors: Afro Rossanese, Noventa di Piave (IT); Maurizio Bazzo, Oderzo (IT)

(73) Assignee: Inglass S.r.l., San Polo Di Piave (TV) (IT)

( * ) Notice: Subject to any disclaimer, the term of this patent is extended or adjusted under 35 U.S.C. 154(b) by 886 days.

This patent is subject to a terminal disclaimer.

(21) Appl. No.: 11/047,498

(22) Filed: Jan. 31, 2005

(65) Prior Publication Data

US 2006/0076710 A1    Apr. 13, 2006

(30) Foreign Application Priority Data

Oct. 11, 2004    (IT)    ................ TO04A0702

(51) Int. Cl.
    B29C 45/16    (2006.01)
(52) U.S. Cl. .................. 264/255; 264/328.7; 264/328.8
(58) Field of Classification Search ........................ None
See application file for complete search history.

(56) References Cited

U.S. PATENT DOCUMENTS 5,762,855 A * 6/1998 Betters et al. ............ 264/328.8
5,863,479 A * 1/1999 Ohsumi et al. .............. 264/162
6,548,001 B1 * 4/2003 Lichtinger ................... 264/161
7,479,244 B2 * 1/2009 Rossanese et al. ........... 264/255

FOREIGN PATENT DOCUMENTS

DE    20 2004 003 468 U1    7/2004

OTHER PUBLICATIONS

Jochen Mitzler, translation of "Synergy Creates New Technology", Copyrighted—Carl Hanser Verlag, Munchen, Ku Kunstostoffe, plast europe, vol. 91 (2001) 10, pp. 6-9.
Website of Georg Kaufmann AG, English version, Oct. 2001—www.konsens.de/gktool/ghtool_2001_08_022_e.htm "Mould for back injection of painted foils".
Knights, MikeII "Sequential Valve Gating" Plastics Technology, Dec. 2003, available at http://www.ptonline.com/articles/200312fa1.html.

* cited by examiner

Primary Examiner—Edmund H. Lee
(74) Attorney, Agent, or Firm—Heslin Rothenberg Farley & Mesiti P.C.; Victor A. Cardona, Esq.

(57) ABSTRACT

Described herein is a process for the production of plates made of transparent plastic material with non-transparent overmoulded parts by means of a first direct injection and subsequent compression for the formation of the transparent plate, and a second injection for overmoulding said parts on the transparent plate, covering the indicators or witness marks of the first injection. Each injection can be in spots controlled in sequence, and the second injection can be followed by a respective step of post-compression.

8 Claims, 3 Drawing Sheets

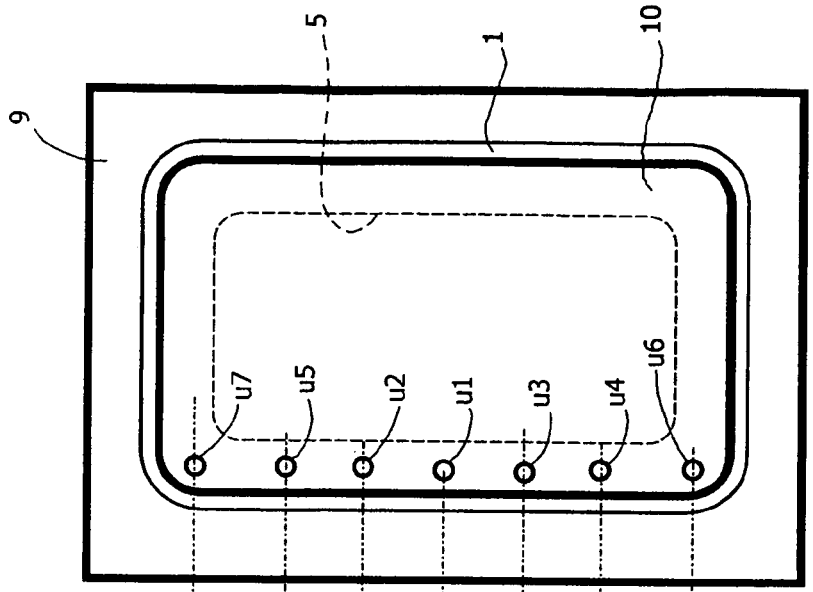
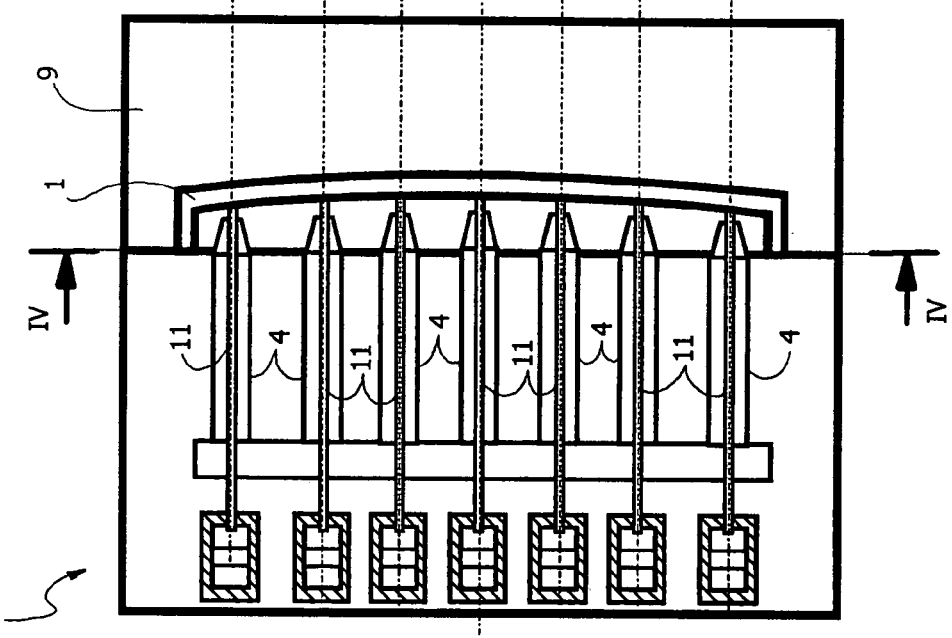
FIG. 3
FIG. 4

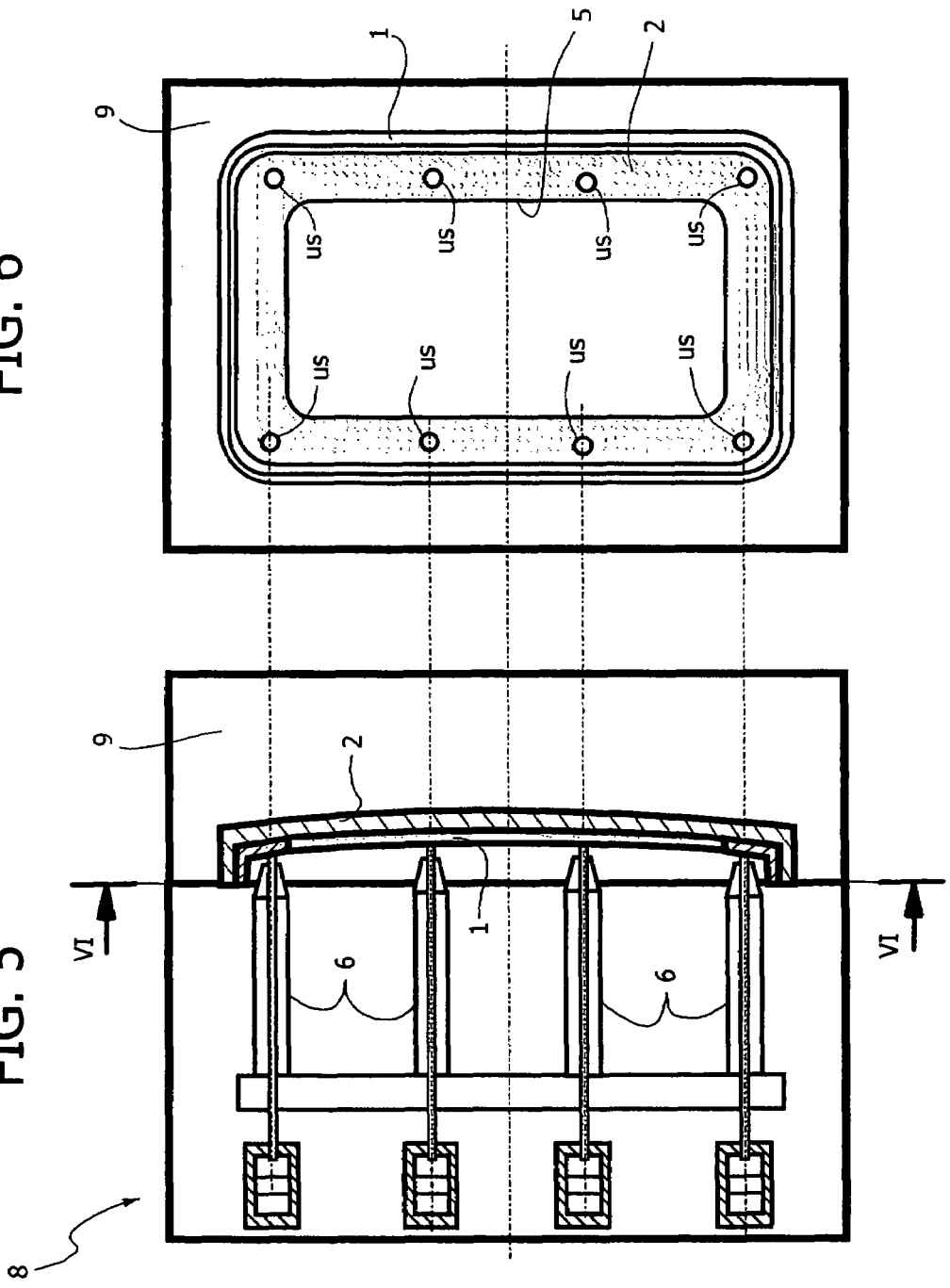

PROCESS FOR THE PRODUCTION OF PLATES MADE OF TRANSPARENT PLASTIC MATERIAL WITH NON-TRANSPARENT OVERINJECTED PARTS

CROSS-REFERENCE TO RELATED APPLICATIONS

This application claims priority from Italian application number TO2004A000702, filed on Oct. 11, 2004, the entire disclosure of which is incorporated herein by reference.

This application also relates to U.S. patent application Ser. No. 11/047,480, filed on Jan. 31, 2005, and titled "AN APPARATUS AND A METHOD FOR THE INJECTION-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,500, filed on Jan 31, 2005, and titled "A PROCESS FOR THE PRODUCTION OF PLATES MADE OF TRANSPARENT PLASTIC MATERIAL WITH NON-TRANSPARENT AREAS," the contents of which are incorporated herein by reference.

This application also relates to U.S. patent application Ser. No. 11/047,498, filed Jan. 31, 2005, and titled "A PROCESS FOR THE PRODUCTION OF PLATES MADE OF TRANSPARENT PLASTIC MATERIAL WITH NON-TRANSPARENT OVERINJECTED PARTS," the contents of which are incorporated herein by reference.

This application also relates to U.S. patent application Ser. No. 11/047,483, filed on Jan. 31, 2005, and titled "A METHOD AND AN APPARATUS FOR THE PRODUCTION OF ARTICLES MADE OF MOULDED PLASTIC MATERIAL PARTICULARLY BY MEANS OF INJECTO-COMPRESSION," the contents of which are incorporated herein by reference.

This application also relates to U.S. patent application Ser. No. 11/047,106, filed on Jan. 31, 2005, and titled "AN APPARATUS AND A METHOD FOR INJECTO-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,104, filed on Jan. 31, 2005, and titled "A PROCESS FOR THE PRODUCTION OF PLATES MADE OF PLASTIC MATERIAL WITH PARTS OVERMOULDED BY INJECTION COMPRESSION," the contents of which are incorporated herein by reference.

This application also relates to U.S. patent application Ser. No. 11/047,937, filed on Jan. 31, 2005, and titled "AN APPARATUS AND A PROCESS FOR THE INJECTION COMPRESSION MOULDING OF ARTICLES MADE OF PLASTIC MATERIAL WITH TWO COMPONENTS," the contents of which are incorporated herein by reference.

FIELD OF THE INVENTION

The present invention relates to the production of articles made of transparent plastic material, particularly but not exclusively plates such as window panels for the automotive field or screens for plasma televisions, with more or less limited non-transparent areas, whether discrete or continuous, peripheral or internal.

STATE OF THE PRIOR ART

Traditionally, such plates are produced by means of injection moulding. The transparent material, typically polycarbonate, is much more sensitive than other plastic materials to lines of flow, joints, etc., so much so that, as the dimensions of the products increase, the difficulties of injection are such that it is impossible to eliminate some typical aesthetic and optical defects unless very sophisticated injection systems are provided. For items of modest dimensions, the so-called "film-injection" system is effectively used. This system enables many of the problems typical of these transparent plastic materials to be solved but, as the dimensions increase, does not enable sufficiently high levels of quality to be achieved. Furthermore, this type of injection involves cutting of the appendage of the film projecting from the moulded plate, said appendage having a non-negligible mass with respect to that of the product and involving an evident waste of material.

Furthermore, for these transparent plates, in relation to the different applications for which they are designed (and in particular in the case of use in the automotive sector), the reduction of residual internal stresses ("in-mould stresses" ) is of fundamental importance. These stresses tend in fact to deform the product, altering its optical properties.

SUMMARY OF THE INVENTION

The purpose of the invention is to overcome the limitations imposed by film-injection systems and enable an efficient production of articles made of transparent plastic material, particularly but not exclusively plates, with parts of non-transparent material, as a continuous or discontinuous peripheral edge, having optimal aesthetic and optical properties.

With a view to achieving said purpose, the subject of the present invention is a process for the production of plates made of transparent plastic material with overinjected non-transparent parts, basically characterized in that it comprises the following steps:

providing a mould, a first moulding station with at least one first injector, a second moulding station with at least one second injector, said injectors being located in a position directly corresponding to an area of the plate to be produced;

moulding said transparent plastic material by means of injection-compression to limit the stresses on the injection spots generating said transparent plate with indicator of injection or witness mark; and injecting the non-transparent plastic material within said mould in the second moulding station via said at least one second injector so as to overmould said parts on said transparent plate, thus covering said indicator of injection.

The process according to the invention conveniently envisages the use of a set of first injectors in said first moulding station and of a set of second injectors in said second moulding station, said first and second injectors being aligned in a position directly corresponding to said area of the plate to be produced.

Typically, said area may be constituted by a peripheral edge of the plate, or else by internal areas, and possibly by the entire extension of the transparent plate.

The injection of the transparent plastic material can advantageously be performed according to a particular sequential modality, and there is conveniently envisaged a step of compression not only at the end of the step of injection of the transparent plastic material, but also at the end of the step of injection of the non-transparent plastic material so as to reduce sensibly possible residual stresses of the plate.

BRIEF DESCRIPTION OF THE DRAWING

The invention will now be described in detail with reference to a non-limiting example of embodiment of the process, with reference to the annexed plate of drawings, in which:

FIG. 3 is a partially sectioned side elevation, which shows a first step of the process according to the invention;

FIG. 4 is a cross-sectional view according to the line IV-IV of FIG. 3;

FIG. 5 is a view similar to that of FIG. 3, which shows a second step of the process according to the invention; and FIG. 6 is a cross-sectional view according to the line VI-VI of FIG. 5.

DETAILED DESCRIPTION OF THE INVENTION

Figure 1:
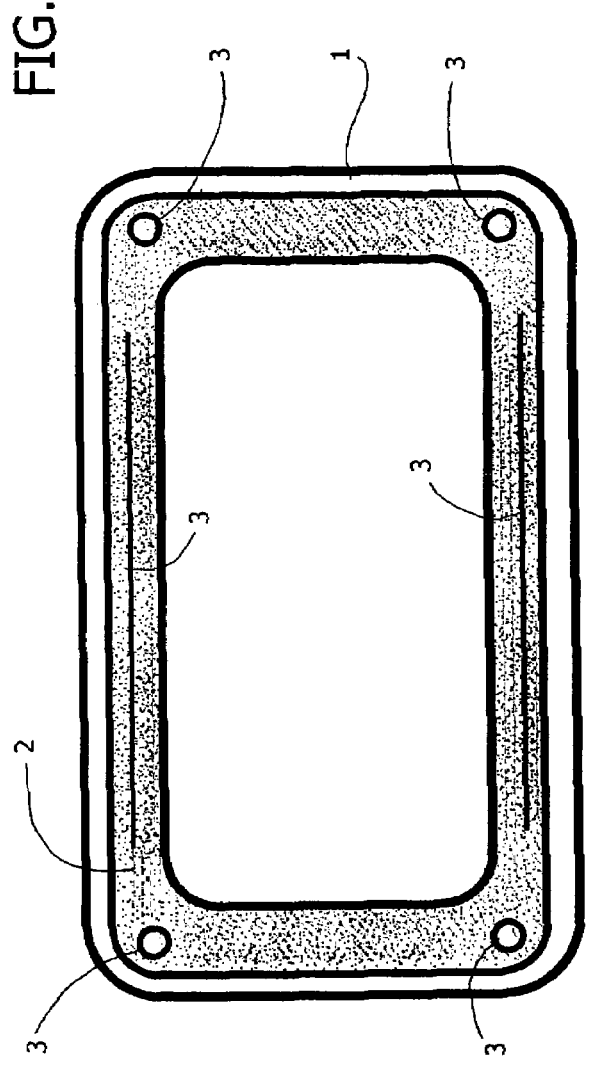
FIG. 1 is a schematic dorsal elevation of a plate made of bi-component plastic material obtained using the process according to the invention.
Figure 2:
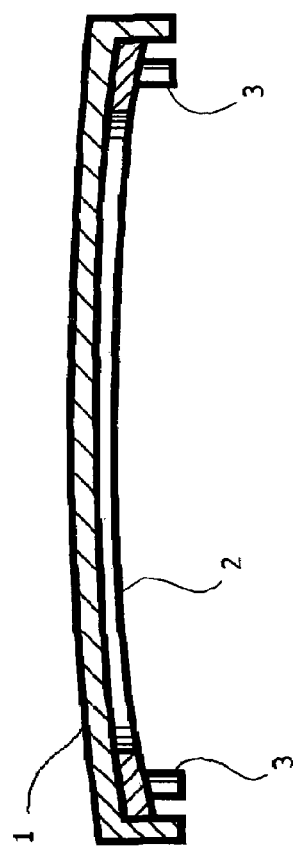
FIG. 2 is a partially sectioned side elevation of FIG. 1.

FIGS. 1 and 2 of the annexed plate of drawings are schematic representations of an example of a product made of bi-component plastic material obtained with the process according to the invention.

The product is constituted by a plate 1 made of transparent plastic material, typically polycarbonate, on the dorsal face of which there is applied a perimetral frame 2 made of non-transparent plastic material, formed with appendages and projections 3 usable for the assembly of the plate in the condition of use.

The process for the production of such a bi-component product envisages two successive steps, described in what follows with reference to FIGS. 3, 4 and 5, 6, respectively.

It should be noted that the process according to the invention can be implemented both on a press for injection moulding equipped with a rotating plate and on a press of the stack-mould type with rotating central surface.

In both cases, two moulding stations will be provided, the first designated by 7 and the second by 8, in a position corresponding to which a mould 9 is subsequently positioned.

The first forming station comprises a half-mould 7 equipped with a set of first injectors 4 of a generally conventional type, with direct plugging via a respective plug 11, which can be axially displaced between a position of closing and a position of opening for introduction within the mould 9 of the transparent plastic material coming, also in a way in itself known, from a hot chamber supplied by a plasticizing system.

It should be noted that the injectors 4 are equipped with respective ring nuts, set in substantially sealed contact with the mould 9, the conformation of which (not illustrated or described herein for reasons of brevity) may be of an innovative type, for an optimal control of temperature, which forms the subject of a parallel Italian patent application filed on the same date by the present applicant.

The injectors 4 of the first moulding station 7 are aligned with respect to one another and located, with respect to the mould 9, in a position directly corresponding to a peripheral area of the transparent plate 1 to be moulded. Said peripheral area is designated by 10 in FIG. 4, and consists of a band adjacent to one of the larger sides of the plate 1 and contained within the internal boundary, designated by 5 in the same FIG. 4, of the perimetral frame 2 that will be subsequently formed in the second moulding station 8.

In the case of the example illustrated, the injectors 4 of the first moulding station 7 are seven in number; they are designated in FIG. 4, respectively, by u1 the central one, by u2 and u3 the ones adjacent on opposite sides to the central injector u1, by u4 and u5 the ones adjacent on opposite sides to the injectors u3 and u2, and by u6 and u7 the end ones, which are adjacent, respectively, to the injectors u4 and u5. Of course, the number of injectors may be greater or smaller according to the dimensions of the plate, as likewise according to their arrangement, but the modalities for their actuation will in any case be similar to the ones described below.

Following upon the half-closing of the mould 9, the injectors 4 are activated so as to introduce the transparent plastic material within the mould 9. The activation can be simultaneous or otherwise; more conveniently, it can be performed according to a particular sequential modality starting from the central injector u1 towards the end injectors u6, u7, as described and illustrated in a parallel Italian patent application filed on the same date by the present applicant.

Even though, in the case of the example illustrated, the injectors 4 are arranged in alignment only along the peripheral area 10 of the plate 1, i.e., as has been said along one of its larger sides, there are no particular limitations in providing further injectors also along the smaller sides and also along the other larger side of the plate 1. However, experimental tests conducted by the present applicant have demonstrated that the arrangement illustrated in the example is normally sufficient for optimal filling of the cavity of the mould 9 also for plates of large dimensions.

Of course, the injectors 4 may be located also in a position corresponding to internal areas of the plate 1.

In the case where the plate 1 is of large dimensions, of fundamental importance is the reduction of residual internal stresses that can be generated, at the end of injection of the transparent plastic material, said in-mould stresses possibly inducing deformations and altering the optical properties of the plate itself.

For this reason, the injection performed as described previously in the first moulding station 7 is followed by a step of compression of the plate 1 as a result of the complete closing of the mould 9 against the half-mould 7. This step of post-compression can be performed with conventional modalities: in the case where the apparatus uses a press of the stack-mould type, this step may be performed according to what is described in the German patent application No. DE-A-10217584, whilst in the case where said step of post-compression is—as will be seen in what follows—also carried out in a position corresponding to the second moulding station 8, it will be necessary, in the case of a stack-mould press, to envisage specific solutions such as the ones described and illustrated in parallel Italian patent applications filed on the same date by the present applicant.

It should be noted that the step of compression can also be performed simultaneously with, instead of subsequently to, the injection step.

At the end of forming of the transparent plate 1, on its peripheral area 10 there are identifiable the indicators or witness marks (in the form of small craters) of the injection spots corresponding to the nozzles of the injectors u1-u7.

The mould 9 is then transferred into a position corresponding to the second moulding station with the half-mould 8, represented in FIGS. 5 and 6. Also in this case, there is provided at least one set of injectors 6 aligned along the peripheral area 10 of the plate 1, and possibly a second set of injectors 6 aligned in a position corresponding to the opposite area (i.e., that of the other larger side of the plate 1) as illustrated in FIG. 6. The nozzles of the injectors 6 are identified in said figure by "us".

The injectors 6 of the one or more series may be fewer in number than the injectors 4 of the first moulding station 7, for example four in number, and it is not necessary for them to be plugging ones. These nozzles 6 may be controlled in sequence or else with simultaneous opening.

The non-transparent plastic material injected by the nozzles 6 will come to form the peripheral frame 2, overmoulding it on the dorsal face of the transparent plate 1 between the perimetral line 5 and the peripheral edge thereof, covering the indicators or witness marks of the injection spots corresponding to the nozzles u1-u7 of the first moulding station 7.

Also in this case, the injection of the peripheral edge 2 may be followed by a step of post-compression for example actuated, in the case where the moulding apparatus uses a stack-mould press, with the modalities described in parallel Italian patent applications filed on the same date by the present applicant.

The process according to the invention enables all the limitations imposed by conventional moulding systems to be overcome, and enables an efficient production of bi-component plates, also with transparent surfaces of large dimensions, free from internal stresses or in any case with extremely low levels of stress and such as to prevent deformations and alterations of their optical properties. These effects are a direct consequence of the peculiar characteristics of the process according to the invention, with direct injection in multiple spots possibly controlled in sequence for the first step and with indicators of the injection of the first step covered by the material of the second injection.

Of course, the details of construction of the apparatus described by way of example for the implementation of the process may vary widely with respect to what is described and illustrated herein, without thereby departing from the scope of the present invention, as defined in the ensuing claims. Thus, as already clarified previously, the parts overmoulded on the plate may differ with respect to the example illustrated herein and may be provided in more or less limited areas, whether discrete or continuous, peripheral or internal to the plate, or also consist of the entire extension of the plate itself. Furthermore, it is understood that the term "plate" is meant to include products having any shape or dimension whatsoever, even ones of small dimensions.

The invention claimed is:

1. A process for the production of plates made of transparent plastic material with overinjected non-transparent parts, the process comprising the following steps:
   providing a mould, a first moulding station with a set of first injectors, a second moulding station with a set of second injectors, said first set of injectors and said second set of injectors being aligned with respect to one another in a position directly corresponding to at least one area of the plate to be produced;
   moulding said transparent plastic material in said first moulding station by injection-compression to limit the stresses on the point of injection, thus generating said transparent plate with an indicator of injection;
   injecting the non-transparent plastic material within said mould in the second moulding station via said at least one second injector so as to overmould said parts on said transparent plate to cover said indicator of injection;
   wherein said at least one area is peripheral or else internal to the plate, or else includes the entire extension of said plate;
   wherein the step of injection of the transparent plastic material via said first set of injectors is performed according to a sequential modality;
   wherein said sequential modality of the first set of injectors comprises first injecting by a central injector of the first set situated in a position corresponding to a median part of a peripheral area of the plate until the areas of said peripheral area corresponding to a first pair of intermediate injectors of the first set of injectors are covered; then injecting by the first pair of intermediate injectors until the areas of the peripheral area corresponding to a second pair of intermediate injectors of the first set are covered; then the injecting by the second pair of intermediate injectors until the area of the peripheral area corresponding to a pair of end injectors of the first set are covered; and finally injecting by the pair of end injectors; and
   wherein said first set of injectors inject said transparent plastic material directly into a first mould cavity of said first moulding station at a first set of injection points and said second set of injectors inject said non-transparent plastic material directly into a second mould cavity of said second moulding station at a second set of injection points on a dorsal face of said transparent plate to cover said indicator of injection, said first set of injection points aligned with said second set of injection points in said position directly corresponding to said at least one area of the plate to be produced.

2. The process according to claim 1, wherein the step of injection of the non-transparent plastic material in a position corresponding to said second moulding station is performed with the mould half-open, and wherein the compressing the non-transparent material comprises closing the mould.

3. The process according to claim 1, wherein the injection-compression comprises compression using a press of the stack-mould type.

4. The process according to claim 1, wherein the injection-compression of the transparent plate comprises compressing performed subsequently to or simultaneously with an injection step.

5. The process according to claim 1, wherein the first set of injectors and second set of injectors are aligned about perpendicular relative to a top surface of the plate to be reproduced.

6. The process according to claim 1, further comprising compressing the non-transparent plastic material on said transparent plate.

7. The process according to claim 1, wherein the step of injection of the non-transparent plastic material via said second set of injectors is performed according to a sequential modality.

8. The process according to claim 1, further comprising forming appendages or projections on the dorsal face during the step of injection of the non-transparent plastic material.

* * * * *